US008682004B2

(12) United States Patent
Grigsby et al.

(10) Patent No.: US 8,682,004 B2
(45) Date of Patent: Mar. 25, 2014

(54) POSITIONAL AUDIO IN A VEHICLE-TO-VEHICLE NETWORK

(75) Inventors: Travis M. Grigsby, Austin, TX (US); William Wood Harter, Jr., Aliso Viejo, CA (US); Steven Michael Miller, Cary, NC (US); Theodore Spencer Tederoff, Edmonton (CA)

(73) Assignee: International Business Machines Corporation, Armonk, NY (US)

( * ) Notice: Subject to any disclaimer, the term of this patent is extended or adjusted under 35 U.S.C. 154(b) by 1523 days.

(21) Appl. No.: 12/044,290

(22) Filed: Mar. 7, 2008

(65) Prior Publication Data

US 2009/0226001 A1 Sep. 10, 2009

(51) Int. Cl.
*H04B 3/00* (2006.01)

(52) U.S. Cl.
USPC ................. 381/77; 381/78; 381/86; 340/435; 340/436; 340/438; 340/903

(58) Field of Classification Search
USPC ........... 381/77, 86, 78; 455/41.2, 556.1, 3.06, 455/39, 90.3, 456.1, 575.1, 154.1; 340/933, 340/988, 996, 438, 435–436, 903; 700/94
See application file for complete search history.

(56) References Cited

U.S. PATENT DOCUMENTS

| | | | | |
|---|---|---|---|---|
| 7,741,962 | B2 * | 6/2010 | Kalik | 340/438 |
| 2007/0111672 | A1 * | 5/2007 | Saintoyant et al. | 455/73 |
| 2008/0085686 | A1 * | 4/2008 | Kalik | 455/154.1 |
| 2010/0245581 | A1 * | 9/2010 | Koyama et al. | 348/149 |

OTHER PUBLICATIONS

Tracy Staedter, "Hello, from the car in front", Jun. 12, 2007, from http://www.abc.net.au/science/news/stories/2007/1949084.htm.
Author Unknown, "Dedicated Short Range Communications", from http://en.wikipedia.org/wiki/Dedicated_Short_Range_Communications.

* cited by examiner

*Primary Examiner* — Disler Paul
(74) *Attorney, Agent, or Firm* — Lee Law, PLLC; Christopher B. Lee

(57) ABSTRACT

In a vehicle-to-vehicle network, a driver may listen to audio generated by other drivers participating in the network. The usability of the audio is enhanced by determining the relative positions of the providing and the receiving vehicles and then distributing received audio to specific speakers in the audio system of the receiving vehicle to create an impression that the sound originates from a source on the line between the two vehicles. The audio distributed to different speakers in the vehicle changes as the relative positions of the two vehicles changes. Volume changes and Doppler effects can be added to the audio if the two vehicles are converging or diverging.

20 Claims, 7 Drawing Sheets

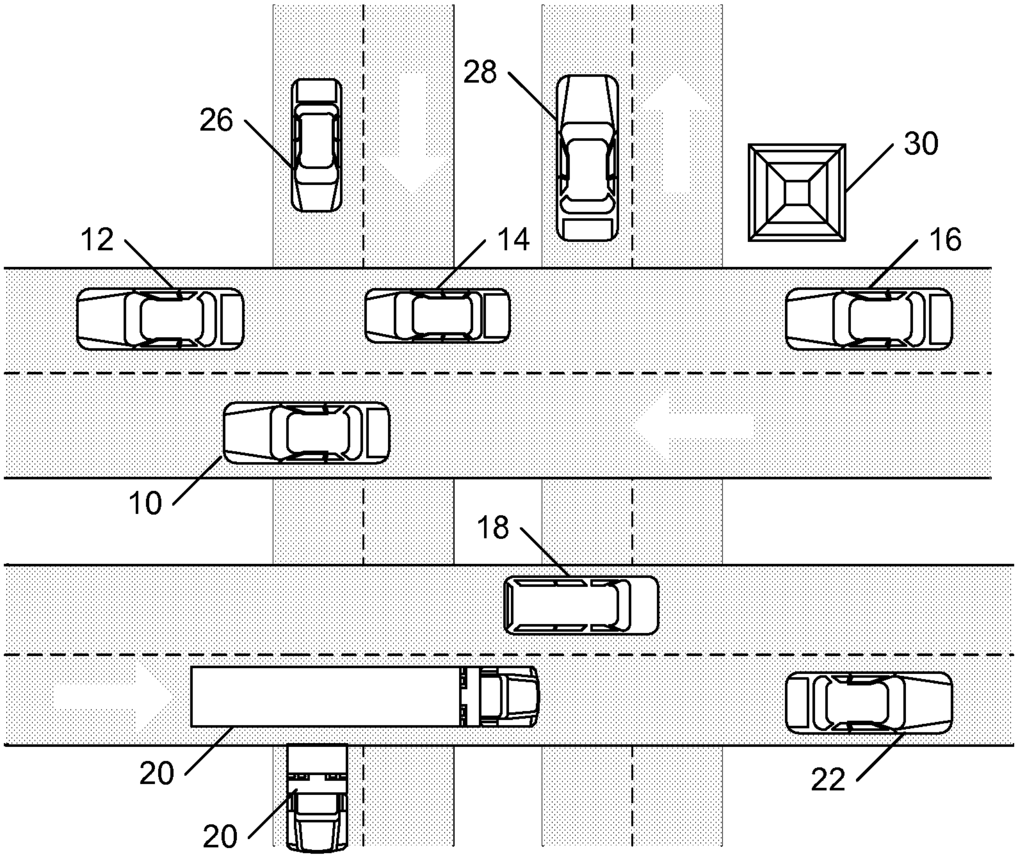
FIG. 1
FIG. 2
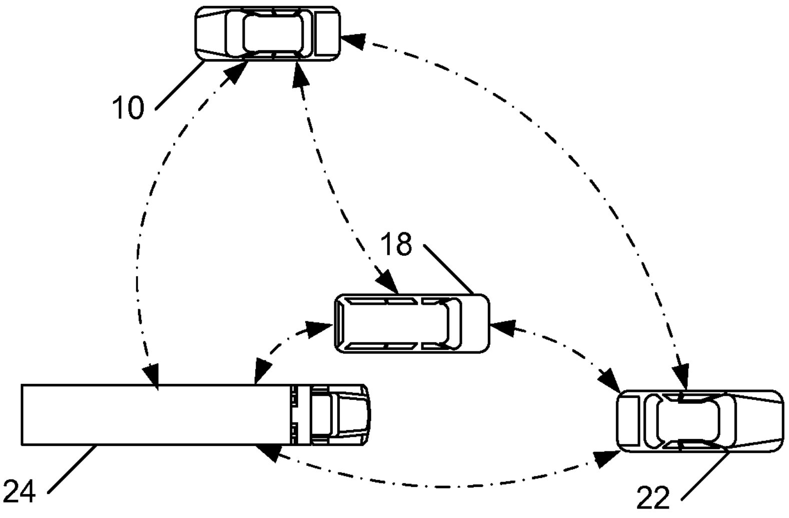

POSITIONAL AUDIO IN A VEHICLE-TO-VEHICLE NETWORK

BACKGROUND OF THE INVENTION

The present invention relates to vehicle-to-vehicle (V2V) networks and more particularly to distribution of audio data to speakers in a vehicle used by a participant in such networks.

Efforts have been underway for some time to establish standards for and to develop technology that would allow drivers within limited geographic areas to “talk” to each other by participating in ad hoc vehicle-to-vehicle networks in which audio, video and other data is shared among participating vehicles. It is envisioned that each vehicle participating in such a vehicle-to-vehicle network would be equipped with microphones for capturing audio data that could be shared directly with other vehicles independently of any existing communications networks, such as cellular telephone networks, and with video cameras for capturing video data both for use within the participating vehicle and for sharing with other vehicles participating in the network.

According to one proposal, data would be shared among vehicles using a Dedicated Short Range Communications (DSRC) wireless protocol operating in the 5.9 Gigahertz band that would support direct vehicle-to-vehicle communications over a relatively short range (100 meters-300 meters). The effective size of the network implemented using the DSRC would be significantly greater than the direct vehicle-to-vehicle maximum range, however, since each vehicle could relay data received from another vehicle to still other vehicles within its range. Relayed data could “hop” one vehicle at the time to vehicles progressively further away from the vehicle that was the source of the data.

Vehicle-to-vehicle networks will serve the general purpose of making participating drivers more aware of what is happening around them and a number of specific purposes, including safety-related purposes. Such networks would permit drivers to alert other drivers of traffic slowdowns, road hazards and approaching emergency vehicles. Such networks could also enable emergency vehicle personnel to alert drivers to their presence, letting alerted drivers anticipate the appearance of the emergency vehicles and more quickly clear paths for them.

One of the appeals of vehicle-to-vehicle technology is the potential for drivers of participating vehicles to have real time audio conversations with drivers of other participating vehicles with each driver hearing the other driver’s voice either through a headset (preferably wireless) or through his vehicle’s audio speakers. It is expected that drivers will use the audio capabilities of vehicle-to-vehicle networks to pass on real-time information to other drivers about road conditions, accidents or vehicle breakdowns that may cause traffic slowdowns, which will allow participating drivers to become of aware of such conditions while there is still time to prepare for them. One of the drawbacks of available technology is that a first driver listening to a second driver receives no audible clues as to where the second driver is relative to the first; i.e., ahead, behind, passing in a parallel lane, going in the opposite direction, etc.

BRIEF SUMMARY OF THE INVENTION

The present invention may be implemented as a method for controlling distribution of audio data in a vehicle-to-vehicle network in which participating vehicles generate audio data that is transmitted to other participating vehicles. A user of a first vehicle provides an input selecting a second vehicle from which audio data is to be received and played using speakers in the first vehicle. The geographic position of the second vehicle relative to the first is determined and the audio data received from the second vehicle is distributed to selected speakers in said first vehicle in accordance with the relative geographic positions of the two vehicles.

The present invention may also be implemented as a computer program product for controlling distribution of audio data in a vehicle-to-vehicle network in which participating vehicles generate audio data that is transmitted to other participating vehicles. The computer program product includes a computer usable medium embodying computer usable program code configured to receive a user input selecting a second vehicle from which audio data is to be received and played using speakers in the user’s vehicle, to establish the geographic position of the second vehicle relative to the first vehicle and to distribute the audio data received from the second vehicle to selected speakers in the first vehicle in accordance with the relative geographic position of the vehicles.

The invention may also be embodied as a system for controlling distribution of audio data to speakers in a first vehicle participating in a vehicle-to-vehicle network in which participating vehicles generate audio data that is transmitted to the other participating vehicles. The system includes a user input system for receiving an input from a user of the first vehicle selecting a second vehicle from which audio data is to be received for play on the vehicle speakers, global positioning logic for establishing the geographic position of the second vehicle relative to the first vehicle and an audio control system for distributing the received audio data to selected speakers in the first vehicle in according with the relative geographic positions of the two vehicles.

BRIEF DESCRIPTION OF THE SEVERAL VIEWS OF THE DRAWINGS

FIG. 1 is an illustration of several roadways traveled by cars and trucks that could participate in a vehicle-to-vehicle network of the type in which the present invention may be implemented.

FIG. 2 is an illustration of a few of the cars and trucks that appear in FIG. 1 with additional graphics representing peer-to-peer communication paths among the vehicles.

DETAILED DESCRIPTION OF THE INVENTION

Figure 3:
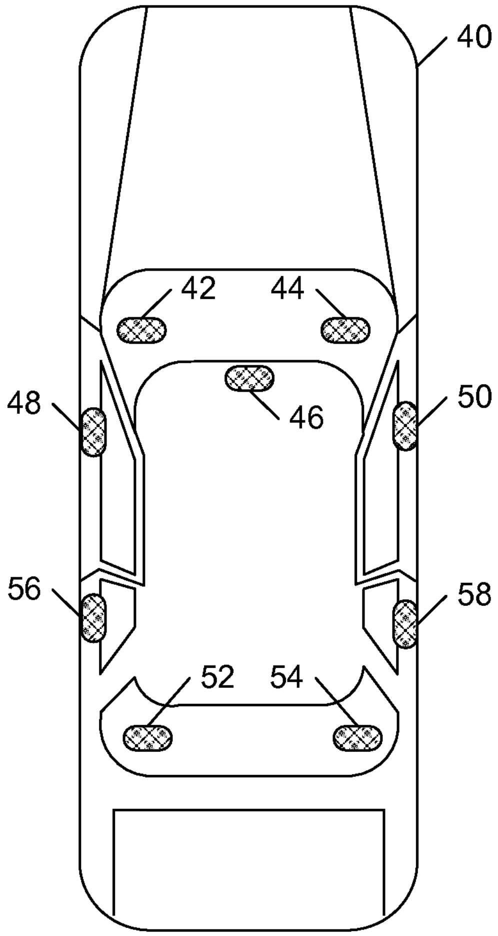
FIG. 3 is an illustration of a single vehicle showing possible positions for audio speakers within the vehicle.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1 and assuming that all of the vehicles shown there are properly equipped, any of the vehicles, such as car 10, may elect to participate in an ad hoc vehicle-to-vehicle (V2V) network including not only car 10 but also cars 12, 14, and 16 that are traveling in the same direction as car 10, cars 18 and 22 and tractor-trailer 20 that are traveling in the opposite direction and even cars 26 and 28 and truck 24 that are traveling orthogonally to car 10. Being a participant in a V2V network means that each participating vehicle will be able to share both locally generated and received audio and video data as well as control data with other participating vehicles.

As a practical matter, roadside base stations, such as base station 30, may be considered participants in V2V networks by receiving data from and providing data to vehicles in the network even though the base stations obviously do not satisfy any reasonable definition of the word “vehicle”.

Referring to FIG. 2, communications among participating vehicles are preferably conducted on a peer-to-peer basis that enables any vehicle in the network to wirelessly communicate directly with any other participating vehicle within a predetermined range determined by the wireless protocol implemented by the network. As noted earlier, the Dedicated Short Range Communications wireless protocol developed for automotive applications has an effective range on the order of 100 to 300 meters, which would be sufficient to enable car 10 to communicate directly with at least cars 18 and 22 and tractor-trailer 20 along with other nearby vehicles (not shown).

The size of the ad hoc network from the perspective of car 10 (or any other participant in the network) is not limited to vehicles with which car 10 may communicate directly. Each participating vehicle can act as a relay point, receiving data from a nearby vehicle and passing it on to other vehicles that are within the direct communication range of the relaying vehicle regardless of whether the target vehicles are beyond the direct communication range of the vehicle from which the data originated. Thus, data can radiate along chains of vehicles, only one or a few of which may be within the direct communication range of the data source.

Referring to FIG. 3, it is assumed that any vehicle that participates in a typical V2V network will have the capability of both generating audio data that may be delivered to other vehicles participating in the network and the capability of receiving and playing audio data received from other vehicles participating in the network. The audio data can be generated when the vehicle driver or a passenger uses a microphone, such as a dashboard microphone or a wireless headset microphone linked to the vehicle-to-vehicle network using a standard wireless protocol such as the Bluetooth protocol. Received audio data stream may be played back through the same wireless headset or using the existing speakers in the vehicle's audio system.

It is not uncommon for vehicles to include audio systems having as many as ten separate speakers that can be used to create stereo or surround sound effects when playing music having embedded control information that enables the vehicle audio system to deliver specific audio content to specific speakers in the vehicle. Nine separate speakers are shown in the drawing in the approximate positions in which such speakers would be mounted in a typical vehicle.

Front speakers 42 and 44 are typically located at the left and right ends of the vehicle dashboard while center speaker 46 is typically located along the center line of the vehicle, either in the dashboard or in a vehicle console separating the driver and a front seat passenger. Left and right speakers 48 and 50 are typically either built into vehicle doors or into vehicle firewalls near the front edges of the doors. Many vehicles include rear speakers 52 and 54 integrated into a rear window ledge of an automobile or a tailgate of a sport utility vehicle or the left and right rear side walls of vehicles which lack either a rear window ledge or a usable tailgate. Some vehicles add door or side wall-mounted left and right rear speakers, such as speakers 56 and 58.

By balancing the strength of the audio signals delivered to different ones of the speakers, it can be made to appear that the audio is originating different points in the vehicle; e.g., directly ahead of the driver, to the left of the driver, to the right of the driver, behind the driver, etc. The techniques and technology for virtual sound sources in a space are well known and will not be discussed.

Vehicles that have an audio delivery system of the type illustrated typically also include a tenth speaker, a subwoofer, that is used to produce deep bass sounds when music being played. No subwoofer is illustrated because the existence of a subwoofer speaker is not significant to the present invention.

The present invention utilizes the audio capabilities that already exist in many vehicles and information that can be obtained in a vehicle-to-vehicle network to cause a participating vehicle to produce positional audio output; that is, audio output that seems to come from the direction of the vehicle or source that is actually generating the audio signals. The positional audio output gives the driver of the receiving vehicle an audible clue as to the location of the driver that is actually providing the audio. The audible clue, in turn, makes it easier for the driver of the receiving vehicle to comprehend and mentally process information contained in the audio.

As a simple example, if a driver hears someone say "Hold on. Something's happening here." and the sound appears to come from directly in front of the driver, the driver can quickly understand that something is going on in the driver's direction of travel without spending the time to go through the thought process of figuring out where "here" is.

The positional audio output in the driver's vehicle is established by controlling the distribution of received audio signals to different speakers in the vehicle's audio system. Generally speaking, stronger audio signals are distributed to speakers that are located on or near a line between the vehicle providing the audio and the vehicle receiving and playing back the audio. The line between the providing and receiving vehicles can be referred to as the relative bearing of the two vehicles taken from the receiving vehicle.

The meaning of the term "relative bearing" is explained with reference to FIG. 4. In that drawing, it is assumed that vehicle 60 receiving audio signals originating from at least one of the vehicles 62, 64, 66, 68, 70 and 72. The relative bearing of each of those vehicles relative to vehicle 60 is defined as the angle between the direction of travel of the receiving vehicle and line between originating and receiving vehicles. Conventionally, any angle formed to the left of the vehicle heading line is considered to be negative about any angle to the right of the vehicle heading line is considered to be positive.

Vehicle 64 is shown as being directly ahead of vehicle 60 and thus is on a bearing of 0° relative to vehicle 60. Vehicle 66 is ahead of but well to the left of vehicle 60 and would have a bearing of approximately −45° relative to vehicle 60. The table below lists the approximate bearings of all of the vehicles shown in the drawing relative to vehicle 60.

| Vehicle | Bearing (degrees) |
|---|---|
| 62 | +030 |
| 64 | 0 |
| 66 | −045 |
| 68 | −090 |
| 70 | −135 |
| 72 | +165 |

Figure 5:
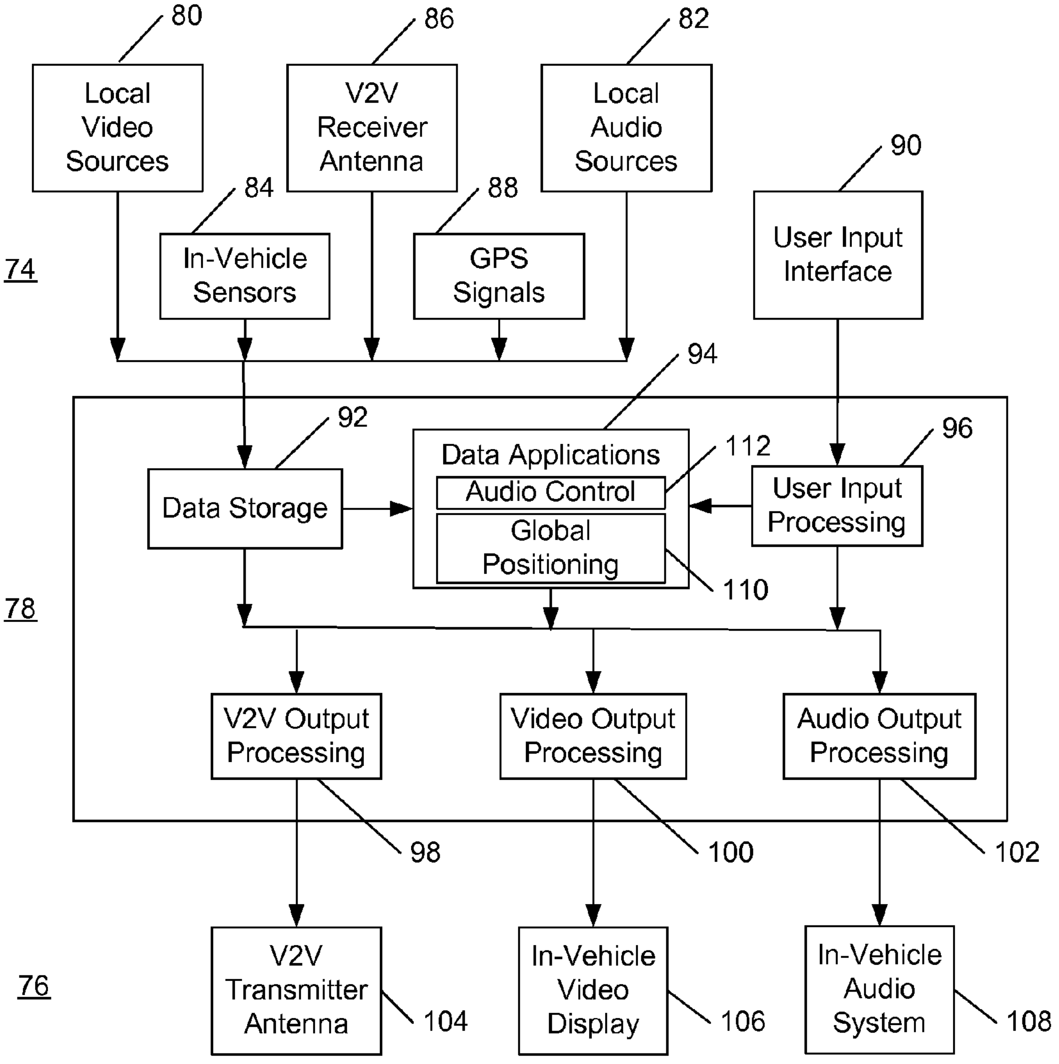
FIG. 5 is the functional block diagram of a system that could be employed to implement the present invention.

FIG. 5 is a functional block diagram of the major functional components of a data processing system for controlling the distribution of audio signals to specific speakers in the audio system of a receiving vehicle to produce positional audio in the receiving vehicle as referred to above. The data processing system can be roughly divided into three major subsystems: an input subsystem 74, an output subsystem 76, and a data processing subsystem 78 that processes incoming data provided by the input subsystem 74 to provide the output data utilized by the output subsystem 78.

The input subsystem 74 includes local video sources 80 such as vehicle-mounted video cameras and local audio sources 82, including such sources as the previously mentioned dashboard microphones or headsets for capturing voice input from drivers and/or passengers. The input subsystem 74 further includes connections to in-vehicle sensors 84, an obvious example of which is a vehicle speedometer, and to a GPS or Global Positioning System subsystem 88 that provides the vehicle's current global location.

The input subsystem 74 further includes a user input interface 90 for acquiring user data and commands. The user input interface can be implemented in a number of known ways. Key input technologies, touchscreen technologies and voice recognition technologies are nonexclusive examples of technologies that can be employed to capture user input.

All of the input subsystems described above can be characterized as local subsystems in that they capture data originating at the vehicle itself. The essence of a V2V network is that each vehicle participating in the network can make use of data provided by other participating vehicles. To make that possible, the input subsystem 74 must include a V2V receiver antenna 86 to acquire audio, video and other data from other vehicles participating in the V2V network.

Input data, both local and remote, is at least initially stored in a data storage subsystem 92 in the data processing subsystem 78. Stored data is retrieved from storage for use by data applications 94 that may be invoked by the vehicle driver or passengers using commands entered at the interface 90 and processed in a user input processing subsystem 96.

Output data resulting from execution of data applications in subsystem 94 may be made available to other participating vehicles through the use of a V2V output processing subsystem 98 connected to a V2V transmitter antenna 104. Depending upon the technologies employed, V2V transmitter antenna 104 and V2V receiver antenna 86 may be the same physical device. Output data may, of course, be used within the vehicle as well. Data intended for an in-vehicle video display 106 undergoes processing in a video output processing stage 100 before being directed to the display. Similarly, data intended for the in-vehicle audio system 108 is processed in an audio output processing stage 102 before being sent to the audio system.

In the illustrated data processing system, the logic for controlling the distribution of received audio signals to specific speakers in the receiving vehicle resides in an audio control module 110 that is part of the data applications section 94. The audio control logic 112, the operations of which are described in greater detail below, relies on vehicle position information provided by a global positioning module 110 that is used to establish the relative bearing between the vehicle that is the source of audio data in the vehicle that receives that audio data.

Figure 6:
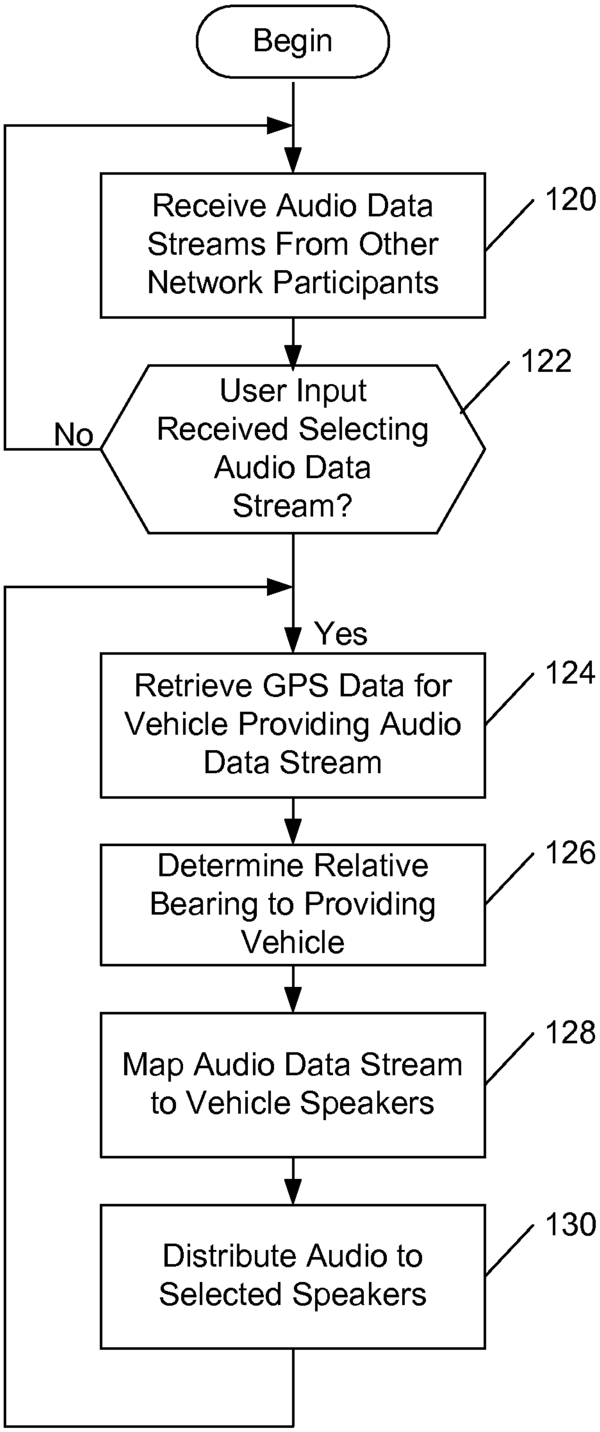
FIG. 6 is a flow chart representing basic operations that would be performed in controlling the distribution of audio data within a vehicle in accordance with the present invention.

FIG. 6 is a flowchart of operations that are performed control the distribution of received audio in accordance with the present invention. For purposes of the flowchart, it is assumed that the data processing system has already been activated and is operating normally. In the course of normal operation of a vehicle-to-vehicle network, each participating vehicle can expect to receive (operation 120) audio data from other network participants. To initiate operation of the present invention, the user of a participating vehicle must select (operation 122) the vehicle that is to provide the audio data that will be played over the speaker system of the receiving vehicle.

Once the providing vehicle is identified, global positioning data for the identified vehicle is retrieved (operation 124) by the receiving vehicle to establish the current position of the providing vehicle. The receiving vehicle will already know its own global position. The global positions of the two vehicles and information about the direction of travel of the receiving vehicle can be used to determine (operation 126) the bearing of the providing vehicle relative to the receiving vehicle. Once the relative bearing is established, the bearing information can be used in the mapping distribution of the audio data stream to specific speakers in the receiving vehicle's audio system (operation 128). As noted earlier, stronger audio signals will be distributed to vehicle speakers on or near the bearing line between the providing vehicle in the receiving vehicle.

Figure 4:
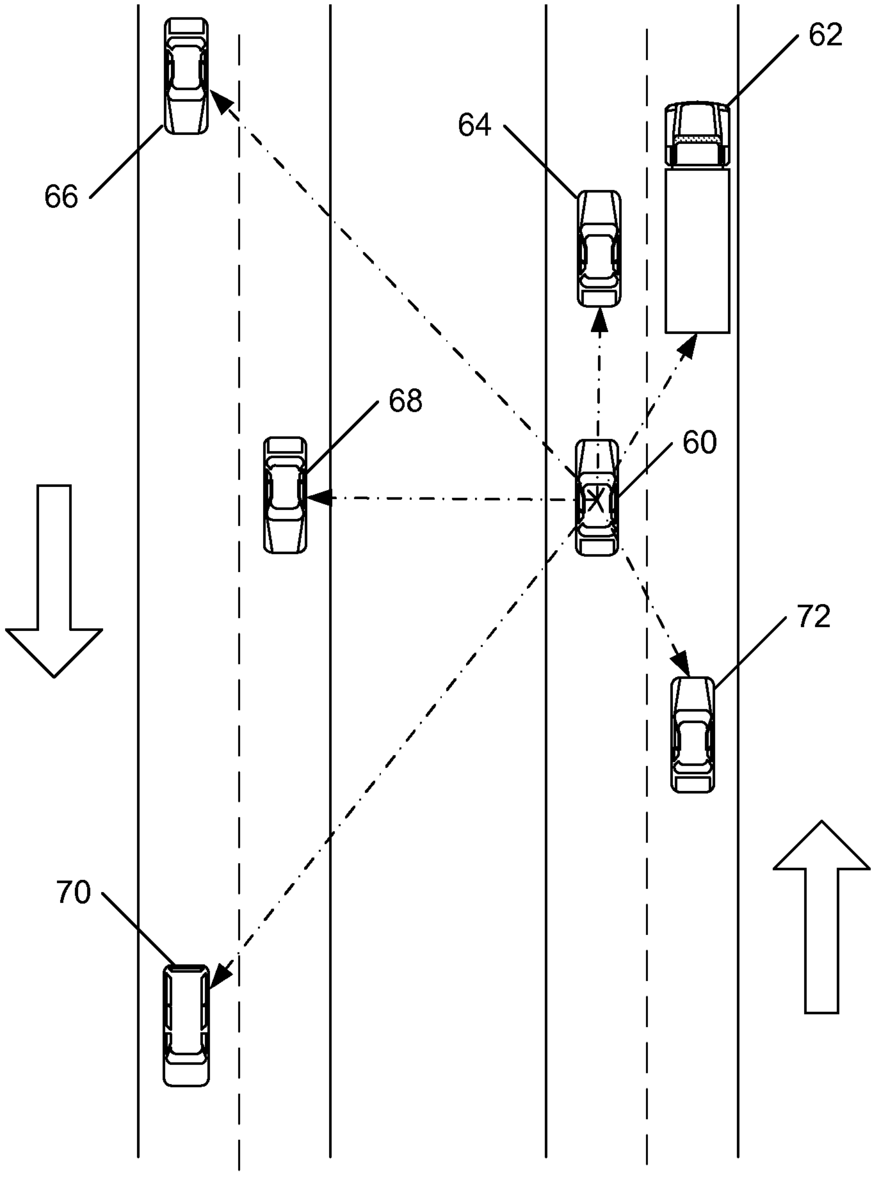
FIG. 4 depicts a typical traffic scenario and is used to illustrate the concept of relative geographic positions for any two vehicles.

As a specific example and referring momentarily to FIG. 4, assume that the driver of vehicle 60 has elected to use audio data generated by vehicle 66 which, at the moment depicted in FIG. 4, is ahead of but well to the left of vehicle 66. Now referring momentarily to FIG. 3, the vehicle speakers that are closest to the line between vehicles 66 and 60 are the front left speaker 42 and the left door speaker 48. To create a virtual sound source lying along the line between vehicles 66 and 60, the strongest audio signals would be distributed to speakers 42 and 48 with weaker signals possibly being distributed to speakers 44, 46 and 56.

Since both vehicles are moving and are constantly changing position relative to one another, the distribution of the audio signal to the various speakers in the receiving vehicle must also constantly change. As the two vehicles are traveling in opposite directions, the stronger audio signals will shift from speakers 42 and 48 to speakers 48 and 56 (as the vehicles pass each other) and then to speakers 56 and 52 as the two vehicles draw away from one another.

Thus, once the audio is distributed to the selected vehicle speakers (operation 130 in FIG. 6), the operations of determining the relative bearing of the two vehicles and distributing the audio signals in accordance with the newly determined bearing are repeated. The program loop consisting of operations 124, 126, 128 and 130 is repeated constantly until the two vehicles move out of range of one another or until the driver of the receiving vehicle selects a different vehicle from which to receive audio data.

Figure 7:
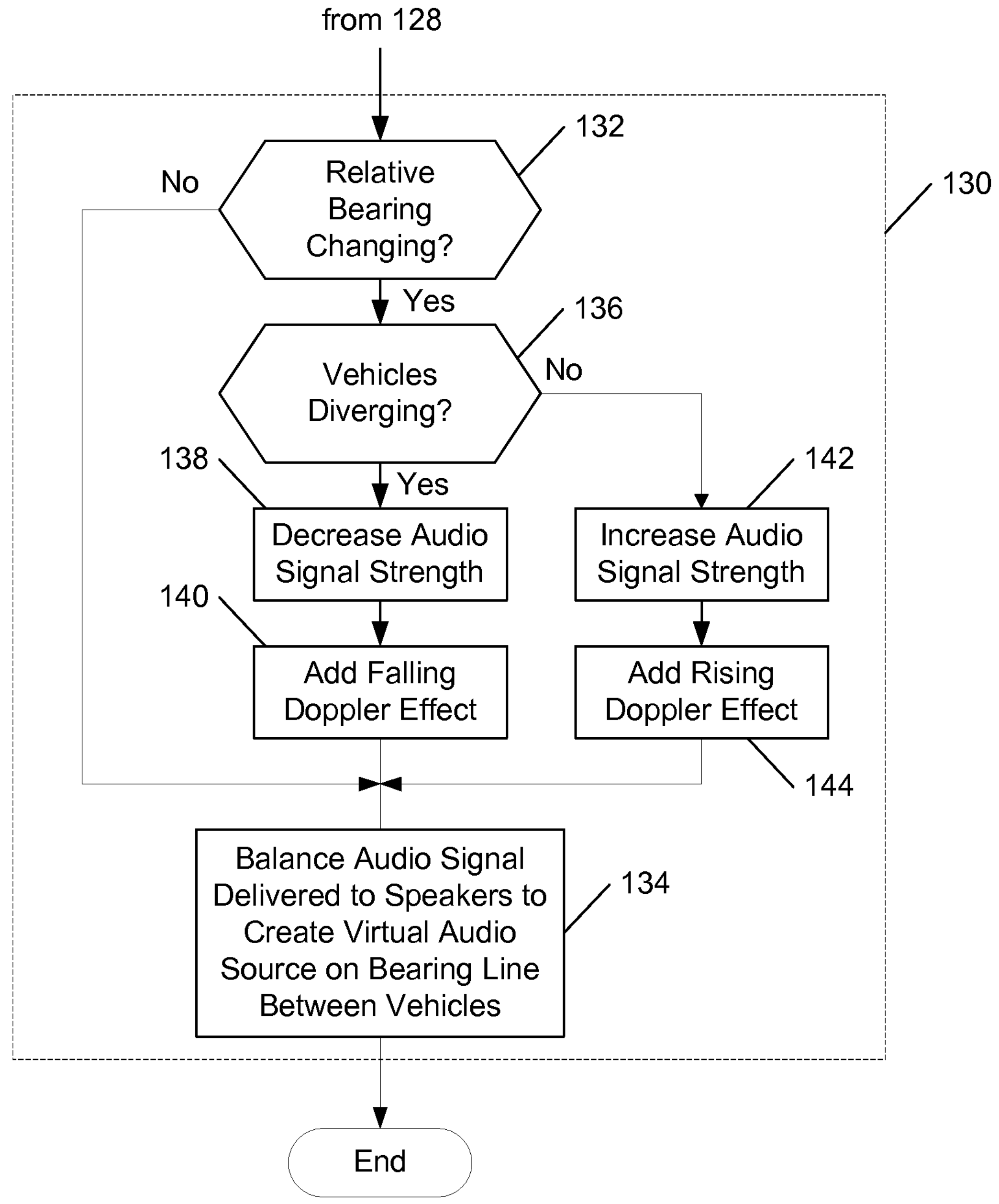
FIG. 7 is a flow chart that expands upon one of the operations shown in the flow chart of FIG. 6.

In distributing audio signals to the speakers, the audio control system may impose audio effects that mimic effects that occur naturally when a sound source changes position relative to a sound receiver. Referring to FIG. 7, which provides greater detail about the operation 130 of distributing audio to specific vehicle speakers, which audio effects are to be used and when they are to be used is determined by changes in the relative positions of the two vehicles. Global positioning information for the two vehicles is used in an operation 132 that determines whether the relative position of the vehicles is changing. The relative bearing of two moving vehicles does not necessarily change since both vehicles can be moving in the same direction of travel with the same speed. Assuming the relative bearing of the two vehicles is not changing, the only audio distribution operation that needs to be performed is to adjust the audio signals delivered to different vehicle speakers to create a virtual audio source on the current line between the two vehicles.

If, however, operation 132 shows that the relative positions of the two vehicles are changing, a check (operation 136) is made to determine whether the two vehicles are diverging; that is, pulling away from one another. If the vehicles are diverging, the strength of the audio signal delivered to the speakers can be decreased to reduce the volume of the audio produced by the speakers. There are, of course, limits on how much the volume can be reduced since the driver of the receiving vehicle must continue to be able to hear the audio. In one embodiment of the invention, the audio data stream generated when the two vehicles are diverging may be further modified by adding a falling Doppler effect, is shown in an operation 140.

If the operation 136 does not show that the two vehicles are diverging even though the relative positions of the two vehicles are changing, it is assumed that the vehicles are converging or approaching one another. In this case, the strength of the audio signal delivered to the selected speakers is increased (operation 142) to produce at least a moderate increase in the volume of the audio produced by the selected speakers. Similarly, a rising Doppler effect may be imposed (operation 144) on the audio data stream.

It is foreseeable that governmental authorities may equip emergency vehicles, such as police cars, fire trucks and ambulances, with audio message generators capable of generating override audio messages that can be broadcast to every other vehicle in an ad hoc vehicle-to-vehicle network in which the emergency vehicle is a participant. Broadcast audio messages could warn other network participants of major traffic problems ahead or of the approach of the emergency vehicle. Such audio messages could include specific directions (e.g., Move immediately as far as possible to the right!) that could be adhered to by the recipients before they ever see the approaching emergency vehicle. Other than being given priority over user selections, audio messages generated by emergency vehicles would be handled the same way as messages from non-emergency sources.

Figure 8:
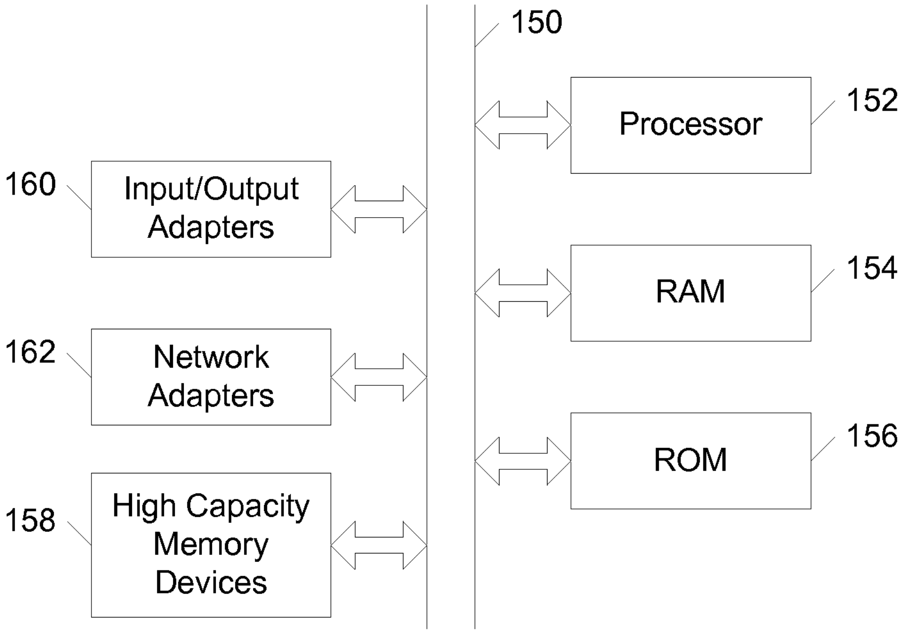
FIG. 8 is a functional block diagram of the hardware infrastructure of a programmable general-purpose computer device that could be used in implementing the present invention.

The invention may be implemented through the use of special-purpose hardware of the type functionally described earlier. Alternatively, the invention may be implemented by programming a general purpose computer device having an infrastructure of the type illustrated in FIG. 8. The infrastructure includes a system bus 150 that carries information and data among a plurality of hardware subsystems including a processor 152 used to execute program instructions received from computer applications running on the hardware. The infrastructure also includes random access memory (RAM) 154 that provides temporary storage for program instructions and data during execution of computer applications and a read only memory (ROM) 156 often used to store program instructions required for proper operation of the device itself, as opposed to execution of computer applications. Long-term storage of programs and data is provided by high-capacity memory devices 158, such as magnetic hard drives or optical CD or DVD drives.

In a typical computer system, a considerable number of input/output devices are connected to the system bus 150 through input/output adapters 160. Commonly used input/output devices include monitors, keyboards, pointing devices and printers. Increasingly, high capacity memory devices are being connected to the system through what might be described as general-purpose input/output adapters, such as USB or FireWire adapters. Finally, the system includes one or more network adapters 162 that are used to connect the system to other computer systems through intervening computer networks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

For example, while the detailed description addresses a horizontal or two dimensional operation that assumes all participating vehicles are on the same general level, three dimensional (horizontal and vertical) operation is also possible for properly equipped vehicles. Assuming the speaker system in a particular receiving vehicle is capable of generating audio that appears to be emanate somewhere above or below a driver's head, the present invention may be used to create virtual sound sources on a inter-vehicle geographic bearing having both horizontal and vertical components. Three dimensional operation would be useful to drivers traversing multi-level roadways, such as double deck bridges, or multi-level flyovers or cloverleafs.

What is claimed is:

1. A method for controlling distribution of audio data to speakers in a first vehicle participating in a vehicle-to-vehicle network in which participating vehicles generate audio data that is transmitted to other participating vehicles, comprising:

receiving a plurality of audio data streams comprising an audio data stream received from each of a plurality of vehicle-to-vehicle network participant vehicles of the vehicle-to-vehicle network;

providing indications of the received plurality of audio data streams to a user of the first vehicle to allow selection of audio data streams received from the plurality of vehicle-to-vehicle network participant vehicles to play over a speaker system of the first vehicle;

receiving an input from the user of the first vehicle selecting one of the received plurality of audio data streams received from a second vehicle participating in the vehicle-to-vehicle network;

establishing a geographic bearing of the second vehicle relative to the first vehicle using geographic position information of the first vehicle and the second vehicle;

mapping the established geographic bearing of the second vehicle relative to the first vehicle onto specific speakers of the speaker system of the first vehicle;

selecting the specific speakers in the first vehicle to distribute the selected audio data stream received from the second vehicle in accordance with the mapped established geographic bearing; and distributing the selected audio data stream received from the second vehicle to the selected specific speakers in the first vehicle in accordance with the established geographic bearing.

2. The method according to claim 1, where distributing the selected audio data stream received from the second vehicle comprises distributing stronger received audio data signals to a set of the selected specific speakers in the first vehicle that are close to the established geographic bearing.

3. The method according to claim 2, where distributing the selected audio data stream received from the second vehicle comprises balancing a strength of the audio data signals received from the second vehicle and distributed to different selected specific speakers in the first vehicle to establish a virtual received audio source lying along the established geographic bearing.

4. The method according to claim 3, where distributing the selected audio data stream received from the second vehicle comprises changing a level of the received audio data signals distributed to different selected specific speakers as the established geographic bearing changes.

5. The method according to claim 4, further comprising:

determining whether the first vehicle and the second vehicle are converging or diverging;

increasing the level of the received audio data signals if the first vehicle and the second vehicle are determined to be converging; and decreasing the level of the received audio data signals if the first vehicle and the second vehicle are determined to be diverging.

6. The method according to claim 4, further comprising modifying the distributed audio data stream received from the second vehicle using a first Doppler effect if it is determined the first vehicle and the second vehicle are converging and a second Doppler effect if it is determined that the first vehicle and the second vehicle are diverging.

7. The method according to claim 5, further comprising modifying the distributed audio data stream received from the second vehicle using a first Doppler effect if it is determined the first vehicle and the second vehicle are converging and a second Doppler effect if it is determined that the first vehicle and the second vehicle are diverging.

8. A computer program product for controlling distribution of audio data to speakers in a first vehicle participating in a vehicle-to-vehicle network in which participating vehicles generate audio data that is transmitted to other participating vehicles, the computer program product comprising a computer usable device having computer usable program code embodied therewith, the computer usable program code comprising:

computer usable program code configured to receive a plurality of audio data streams comprising an audio data stream received from each of a plurality of vehicle-to-vehicle network participant vehicles of the vehicle-to-vehicle network;

computer usable program code configured to provide indications of the received plurality of audio data streams to a user of the first vehicle to allow selection of the audio data streams received from the plurality of vehicle-to-vehicle network participant vehicles to play over a speaker system of the first vehicle;

computer usable program code configured to receive an input from the user of the first vehicle selecting one of the received plurality of audio data streams received from a second vehicle participating in the vehicle-to-vehicle network;

computer usable program code configured to establish a geographic bearing of the second vehicle relative to the first vehicle using geographic position information of the first vehicle and the second vehicle;

computer useable program code configured to map the established geographic bearing of the second vehicle relative to the first vehicle onto specific speakers of the speaker system of the first vehicle;

computer usable program code configured to select the specific speakers in the first vehicle to distribute the selected audio data stream received from the second vehicle in accordance with the mapped established geographic bearing; and computer usable program code configured to distribute the selected audio data stream received from the second vehicle to the selected specific speakers in the first vehicle in accordance with the established geographic bearing.

9. The computer program product according to claim 8, where the computer usable program code configured to distribute the selected audio data stream received from the second vehicle comprises computer usable program code configured to distribute stronger received audio data signals to a set of the selected specific speakers in the first vehicle that are close to the established geographic bearing.

10. The computer program product according to claim 9, where the computer usable program code configured to distribute the selected audio data stream received from the second vehicle comprises computer usable program code configured to balance a strength of the audio data signals received from the second vehicle and distributed to different selected specific speakers in the first vehicle to establish a virtual received audio source lying along the established geographic bearing.

11. The computer program product according to claim 10, where the computer usable program code configured to distribute the selected audio data stream received from the second vehicle comprises computer usable program code configured to change a level of the received audio data signals distributed to different selected specific speakers as the established geographic bearing changes.

12. The computer program product according to claim 11, further comprising:

computer usable program code configured to determine whether the first vehicle and the second vehicle are converging or diverging;

computer usable program code configured to increase the level of the received audio data signals if the first vehicle and the second vehicle are determined to be converging; and computer usable program code configured to decrease the level of the received audio data signals if the first vehicle and the second vehicle are determined to be diverging.

13. The computer program product according to claim 11, further comprising computer usable program code configured to modify the distributed audio data stream received from the second vehicle using a first Doppler effect if it is determined the first vehicle and the second vehicle are converging and a second Doppler effect if it is determined that the first vehicle and the second vehicle are diverging.

14. The computer program product according to claim 12, further comprising computer usable program code configured to modify the distributed audio data stream received from the second vehicle using a first Doppler effect if it is determined the first vehicle and the second vehicle are converging and a second Doppler effect if it is determined that the first vehicle and the second vehicle are diverging.

15. A system for controlling distribution of audio data to speakers in a first vehicle participating in a vehicle-to-vehicle network in which participating vehicles generate audio data that is transmitted to other participating vehicles, the system comprising:

a vehicle-to-vehicle antenna configured to receive a plurality of audio data streams comprising an audio data stream received from each of a plurality of vehicle-to-vehicle network participant vehicles of the vehicle-to-vehicle network;

an in-vehicle video display configured to provide indications of the received plurality of audio data streams to a user of the first vehicle to allow selection of the audio data streams received from the plurality of vehicle-to-vehicle network participant vehicles to play over a speaker system of the first vehicle;

a user input system configured to receive an input from the user of the first vehicle selecting one of the received plurality of audio data streams received from a second vehicle participating in the vehicle-to-vehicle network;

global positioning logic configured to establish a geographic bearing of the second vehicle relative to the first vehicle using geographic position information of the first vehicle and the second vehicle; and an audio control processor configured to:

map the established geographic bearing of the second vehicle relative to the first vehicle onto specific speakers of the speaker system of the first vehicle;

select the specific speakers in the first vehicle to distribute the selected audio data stream received from the second vehicle in accordance with the mapped established geographic bearing; and distribute the selected audio data stream received from the second vehicle to the selected specific speakers in the first vehicle in accordance with the established geographic bearing.

16. The system according to claim 15, where, in being configured to distribute the selected audio data stream received from the second vehicle to the selected specific speakers in the first vehicle in accordance with the established geographic bearing, the audio control processor is configured to distribute stronger received audio data signals to a set of the selected specific speakers in the first vehicle that are close to the established geographic bearing.

17. The system according to claim 16, where, in being configured to distribute the selected audio data stream received from the second vehicle to the selected specific speakers in the first vehicle in accordance with the established geographic bearing, the audio control processor is configured to balance a strength of the audio data signals received from the second vehicle and distributed to different selected specific speakers in the first vehicle to establish a virtual received audio source lying along the established geographic bearing.

18. The system according to claim 17, where, in being configured to distribute the selected audio data stream received from the second vehicle to the selected specific speakers in the first vehicle in accordance with the established geographic bearing, the audio control processor is configured to change a level of the received audio data signals distributed to different selected specific speakers as the established geographic bearing changes.

19. The system according to claim 18, where:

the global positioning logic is further configured to determine whether the first vehicle and the second vehicle are converging or diverging; and the audio control processor is further configured to increase the level of the received audio data signals if the first vehicle and the second vehicle are determined to be converging and decrease the level of the received audio data signals if the first vehicle and the second vehicle are determined to be diverging.

20. The system according to claim 19, where the audio control processor is further configured to modify the distributed audio data stream received from the second vehicle using a first Doppler effect if it is determined the first vehicle and the second vehicle are converging and a second Doppler effect if it is determined that the first vehicle and the second vehicle are diverging.

* * * * *